Figure 1:
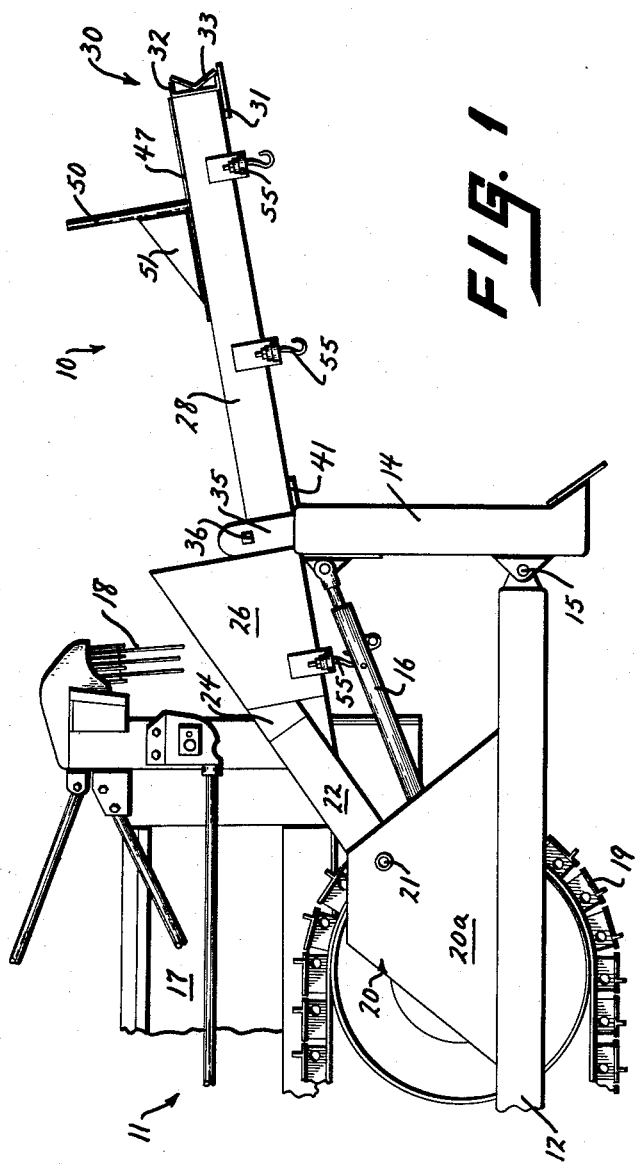

April 5, 1966  E. HELMUTH  3,243,903
TRACTOR ATTACHMENT

Filed June 17, 1963  2 Sheets-Sheet 1

INVENTOR.
EMORY HELMUTH
BY
Attorney

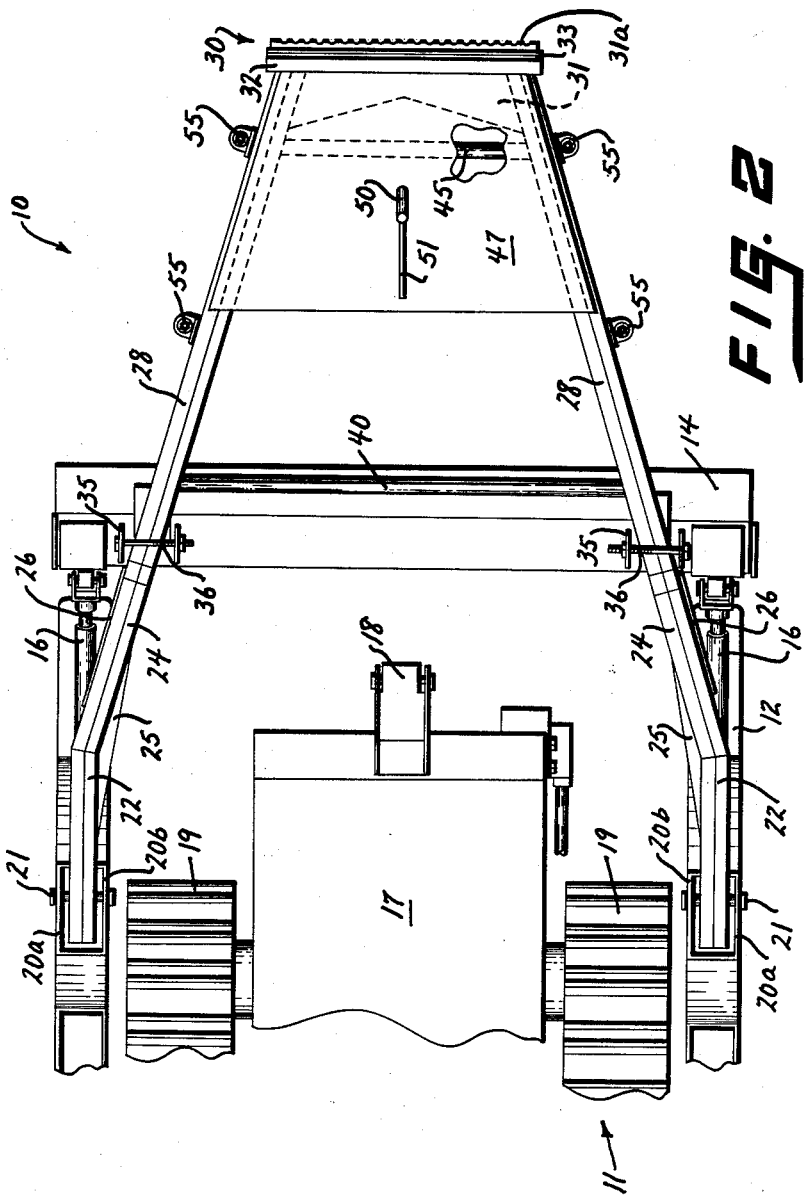

United States Patent Office 3,243,903
Patented Apr. 5, 1966

3,243,903
TRACTOR ATTACHMENT
Emory Helmuth, R.R. 1, Montgomery, Ind.
Filed June 17, 1963, Ser. No. 288,268
3 Claims. (Cl. 37—2)

The present invention relates to a tractor attachment, and more particularly to a new and novel attachment for a bulldozer which serves as a tree pusher and a hoister.

As is known, the removal of trees in land clearing operations generally requires specialized heavy duty equipment, where such equipment is oftentimes not available and/or too costly for practical small scale use. While such specialized equipment is normally satisfactory for performing the desired job, the biggest need lies in the adoption of existing equipment for effective tree pushing and hoisting purposes, an objective which has not been accomplished heretofore.

By virtue of the instant invention, the applicant herein has provided a new and novel tree pusher and hoister attachment which is readily used on a conventional tractor or bulldozer. More particularly, the applicant's invention is readily positioned for use with such tractor through a minimum number of simply made connections, where the overall unit is rigidly assembled for the heavy duty action of tree pushing and/or hoisting. Briefly, the instant attachment is pivotally mounted, in a generally cantilever effect, on the framework of a tractor, and the bulk of the weight thereof is supported on the top of the earthmoving blade forming part of the conventional bulldozer.

Accordingly, the principal object of the present invention is to provide a new and novel tree pushing and/or hoisting attachment for conventional earth moving equipment, such as tractors or bulldozers.

Another object of the present invention is to provide a new and novel attachment for a tractor which serves as tree pusher and/or hoister, and, as such, is readily mounted thereon and is highly effective in use.

A further and more general object of the present invention is to provide a tree pusher attachment for a conventional bulldozer which is readily adapted to use on such bulldozer, which is defined by a minimum number of rigidly assembled components, and which is effectively controlled for positive action.

Other objects and a better understanding of the present invention will become more apparent from the following description, taken in conjunction with the accompanying drawings, wherein FIG. 1 is a view in side elevation showing the applicant's new and novel invention in conjunction with a conventional tractor; and FIG. 2 is a top plan view of the invention of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the applicant's new and novel attachment 10 is shown in conjunction with a conventional tractor 11, where the latter includes a framework 12, a blade 14 pivotally mounted at 15 to a portion of said framework 12, and hydraulic means 16 for moving such blade 14 about pivots 15. Although the specific structure of the tractor 11 will not be further described herein because of its conventional nature, such tractor 11 typically includes an engine 17, a raising and lowering mechanism 18, and endless tracks 19.

In any event, mounting assemblies 20 for the applicant's new and novel tractor attachment 10 are disposed on the framework 12 on opposite sides of the tractor, where rear members 22 of the attachment 10 are pivotally secured thereto at 21. As should be evident from FIG. 2, the members 22 are received between side plates 20a and 20b which define the mounting assemblies 20.

Extending forwardly from the members 22 are intermediate members 24, where plates 25 provide reinforcement therebetween. The attachment 10 further includes pusher arms 28, which extend forwardly from beneath the intermediate members 24. Plate members 26 serve as reinforcement between the intermediate members 24 and the pusher arms 28.

A head portion 30 extending between the pusher arms 28 is defined by a plate 31 positioned beneath and extending beyond such pusher arms 28. A channel member 32 is disposed on the plate 31 and an angle iron 33 is secured to the lattter. As should be apparent from FIG. 2, the plate 31 has a series of cut-out portion 31a along the length thereof to define a cutting edge.

In any event, the pusher arms 28 are adapted to be positioned on the top of the blade 14 defining part of the tractor. In order that the attachment 10 is readily movable with blade 14, upstanding brackets 35 are provided thereon, where the pusher arms 28 respectively pass through such brackets 35. A nut and bolt assembly 36 extends through each of the brackets 35 to limit any vertical movement of the attachment 10 apart from its movement with the blade 14.

The attachment 10 is further completed by the use of a rod 40 which extends between the pusher arms 28, while the latter each include a bumping block 41 on the undersurfaces thereof, which, it will become apparent from the following, serves to pass a portion of the rearward thrust during pushing into the blade 14. Restated otherwise, the bumping block 41 permits the blade 14 to absorb part of the shock during pushing operation, minimizing the shock to the pivots 21.

As should be further apparent from FIG. 2, the applicant's new and novel attachment 10 further includes a positioning rod 45, extending between the pusher arms 28, and on a reinforcing plate 47, which is received on the upper surfaces of the pusher arms 28 adjacent the head portion 30, a horn 50, which, when in use, prevents brush from moving backwardly onto the tractor, and, additionally, serves to prevent trees from moving backwardly during stacking, as well as a pusher. Typically, the horn 50 is disposed at right angles to the reinforcing plate 47, and an auxiliary plate 51 serves to back the horn 50 in such position.

The overall assembly is completed by the use of conventional swivel type chain hooks 55 which are typically disposed along the outer surfaces of the pusher arms 28. It might be noted that in a typical embodiment of the invention, the pusher arms 28 are I-beams which are boxed by outer plates to define a strong, rigid, assembled unit.

In use, the components defining the instant attachment 10 are assembled, as by welding, for example. Thereafter, the rear members 22 are disposed in the mounting assemblies 20 and, subsequently, secured thereto at pivots 21. It should be understood that at this time, i.e. before any further pinning, the attachment 10 is freely pivotal, independently of the blade 14.

In any event, when positioned on the blade 14, and as noted hereabove, the pusher arms 28 forming part of the instant invention are disposed between respective pairs of brackets 35, where, subsequently, nut and bolt assemblies 36 retain such pusher members 28 in position on top of the blade 14. In other words, in that the attachment 10 has now been secured to the blade 14, any movement of the latter through hydraulic means 16 (or, if employed, cable means), causes the attachment 10 to move also.

As noted previously, prior tree removal through pushing action required large sized specialized equipment. Alternatively, the operator would merely use the blade of a conventional bulldozer. However, by virtue of the instant invention, the new and novel attachment at hand permits the removal of trees estimated to be more than 50 percent larger than those which could be removed with the mere use of the blade by itself (i.e. without the attachment 10).

In any event, it should be understood that the applicant's novel pushing and/or hoisting apparatus is readily mounted for use, requiring but four simple connections between same and the tractor.

The head portion 30, at the forward ends of the pusher arms 28, through the knife-like edge 31a along the plate 31, serves to provide versatility and added features to the invention. Additionally, and as mentioned above, the horn 50 is quite significant in its practical prevention of the brush, or like objects, from moving onto the tractor.

The instant invention is readily moved into engagement with trees by movement of the tractor and, hence, the head portion 30, and use of the hydraulic means 16 turns the blade 14 at points 15 on the framework 12, and, at the same time causes the attachment 10 to pivot at 21. Accordingly, various effective removal angles may be retained and performance achieved which has not been possible with prior devices, where, for example, only the blade of a bulldozer was used.

The instant attachment is susceptible, of course, to various changes within the scope of the invention. For example, the dimensioning thereof may be varied, reinforcing changed, and other minor design modifications effected, as desired. Thus, the above description should be considered illustrative, and not as limiting the scope of the following claims.

I claim:

1. An attachment for a tractor having a framework and a blade, means pivotally and tiltably mounting said blade on said framework, comprising, in combination, an attachment framework having one end thereof pivotally secured in cantilever relationship to mounting assemblies forming part of said tractor framework, portions of said attachment framework converging towards each other to define a head portion at the free ends thereof, at least two bracket assemblies disposed on said blade and adapted to slidably receive said converging portions of said attachment framework, means securing said converging portions of said attachment framework in said at least two bracket assemblies, whereby said attachment framework is movable with said blade, reinforcing members extending between portions of said attachment framework in an area proximate said head portion thereof, one of said members comprising a flat plate mounted rearwardly of said head portion on the upper portion of said attachment framework, and a horn member extending upwardly and fixed to said flat plate and spaced rearwardly of the front of said head portion.

2. The tractor attachment of claim 1 where said attachment framework has a thrust absorbing member disposed along a lateral portion thereof in front of said blade, where said thrust absorbing member has a rearwardly facing portion in engaging relationship with said blade.

3. The attachment of claim 1 where said one of said reinforcing members is a plate.

References Cited by the Examiner

UNITED STATES PATENTS

| 2,542,952 | 2/1951 | White. | |
| 2,633,164 | 3/1953 | Kissner | 37—2 X |
| 2,693,650 | 11/1954 | Struemph | 37—2 |
| 2,735,197 | 2/1956 | Struemph | 37—2 |
| 2,845,725 | 8/1958 | Robishaw | 37—2 |
| 3,020,694 | 2/1962 | Foshee. | |
| 3,041,811 | 7/1962 | Sides. | |
| 3,084,727 | 4/1963 | Basham | 144—34 |

FOREIGN PATENTS

| 141,661 | 6/1951 | Australia. |
| 144,135 | 11/1951 | Australia. |
| 159,719 | 10/1954 | Australia. |
| 637,949 | 3/1962 | Canada. |
| 1,123,447 | 6/1956 | France. |

ABRAHAM G. STONE, *Primary Examiner.*

BENJAMIN HERSH, *Examiner.*